United States Patent [19]

Quinn

[11] Patent Number: 4,693,481
[45] Date of Patent: Sep. 15, 1987

[54] FILM-RIDING SHAFT SEAL FORMED FROM HIGH-PURITY SILICON NITRIDE

[75] Inventor: Kenneth P. Quinn, Allison Park, Pa.

[73] Assignee: Westinghouse Electric Corp., Pittsburgh, Pa.

[21] Appl. No.: 739,745

[22] Filed: May 31, 1985

[51] Int. Cl.$^4$ .................... F16J 15/20; C04B 35/58
[52] U.S. Cl. .................... 277/96.2; 277/224; 277/DIG. 6; 501/97
[58] Field of Search .......... 277/96.1, 96.2, 96, 277/224, DIG. 6; 501/97

[56] References Cited

U.S. PATENT DOCUMENTS

| | | |
|---|---|---|
| 1,831,411 | 11/1931 | Dietz . |
| 2,814,513 | 11/1957 | Kupfert et al. ............ 277/96.2 X |
| 3,022,685 | 2/1962 | Armacost . |
| 3,093,087 | 6/1963 | Hansen . |
| 3,144,362 | 8/1964 | Bradd . |
| 3,199,795 | 8/1965 | Bennett et al. ............ 277/96.2 X |
| 3,347,552 | 10/1967 | Frisch . |
| 3,472,701 | 10/1969 | Selover, Jr. et al. . |
| 3,522,948 | 8/1970 | MacCrum . |
| 3,896,009 | 7/1975 | Kobayashi et al. . |
| 4,021,136 | 5/1977 | Sabino, Jr. . |
| 4,106,782 | 8/1978 | Hyde et al. . |
| 4,148,494 | 4/1979 | Zelahy et al. . |
| 4,205,858 | 6/1980 | Shimazaki et al. . |
| 4,226,429 | 10/1980 | Sato et al. . |
| 4,264,547 | 4/1981 | de Pous ................ 501/97 X |
| 4,376,742 | 3/1983 | Mah ................ 501/97 X |
| 4,386,969 | 6/1983 | Kilbert ................ 277/96.2 X |
| 4,391,450 | 7/1983 | Beck . |
| 4,407,512 | 10/1983 | Trytek ................ 277/96.1 |
| 4,411,594 | 10/1983 | Pellow et al. . |
| 4,415,168 | 11/1983 | Takenaka et al. ........... 277/96.1 |

FOREIGN PATENT DOCUMENTS

| | | |
|---|---|---|
| 087888 | 7/1983 | European Pat. Off. ............ 501/97 |
| 2222043 | 11/1973 | Fed. Rep. of Germany ..... 277/96.1 |
| 2222082 | 11/1973 | Fed. Rep. of Germany ..... 277/96.1 |
| 53-148657 | 12/1978 | Japan . |
| 59-174577 | 10/1984 | Japan ................ 501/97 |
| 2029518 | 3/1980 | United Kingdom . |

OTHER PUBLICATIONS

*Powder Metallurgy*, 1961, No. 8, "Dense Silicon Nitride", by G. G. Deeley et al, pp. 145-151.

*Primary Examiner*—Robert S. Ward

[57] ABSTRACT

An improved shaft seal for sealingly and rotatably mounting a torque-transmitting shaft within the pressurized housing of a pump. Generally, the shaft seal comprises a seal ring which is sealingly mounted within the housing, and a runner ring which is sealingly mounted around the shaft. Both the seal ring and the runner are preferably formed from 98% pure, hot-pressed silicon nitride. Additionally, the sealing surface of the seal ring is preferably radially tapered between about 635 and 645 microradians around its outer periphery, and between about 210 and 230 microradians around its inner periphery. The pressurized fluid within the housing enters the annular space between the two sealing surfaces and creates a flowing film of fluid upon which the two sealing surfaces may "ride" without frictionally engaging one another. The shaft seal of the invention is capable of operating in a film-riding mode despite broad variations in the pressure within the housing of the shaft, but is also capable of operating in a non-film-riding mode for long periods of time without damage, should the pump malfunction. The shaft seal finds particular application in the coolant pumps of nuclear steam generators.

13 Claims, 4 Drawing Figures

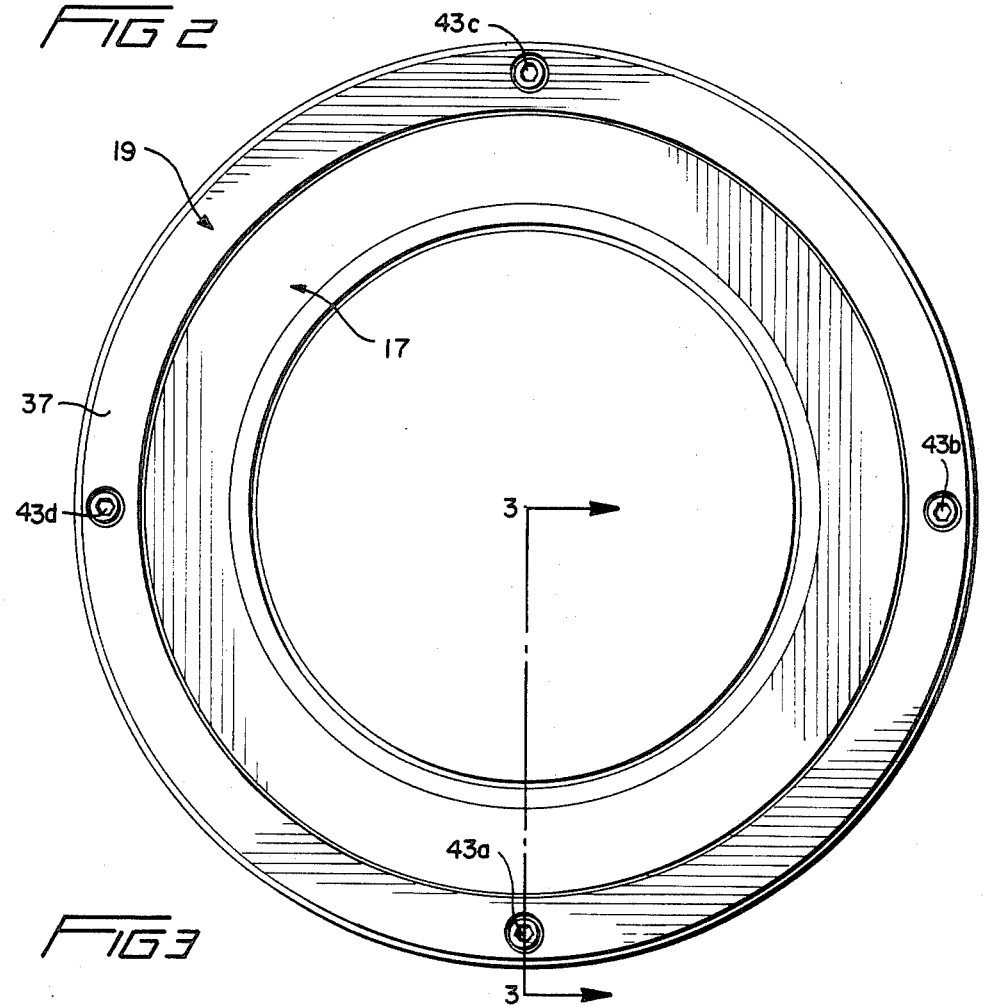
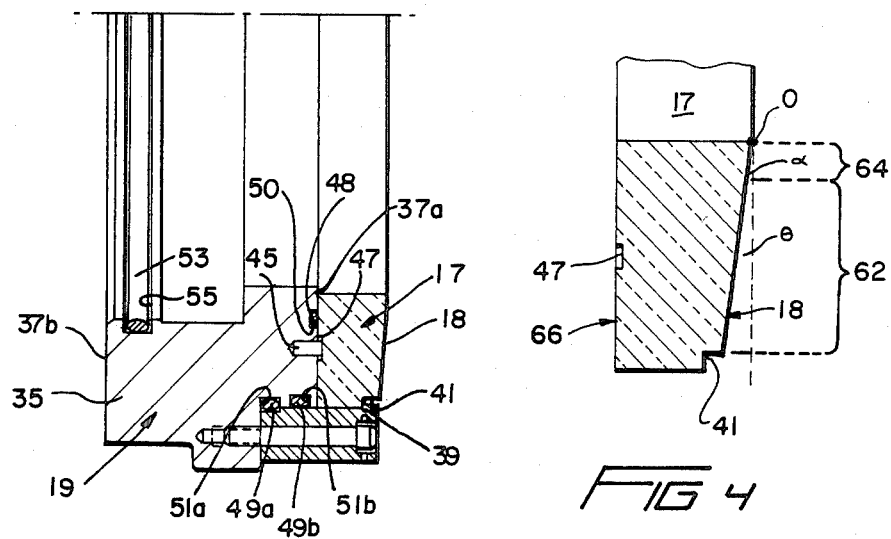

FILM-RIDING SHAFT SEAL FORMED FROM HIGH-PURITY SILICON NITRIDE

BACKGROUND OF THE INVENTION

1. Field of the Invention

This invention generally relates to shaft seals, and is specifically concerned with a hydrostatic, radially tapered film-riding seal which is useful in sealing the shaft of the coolant pump used in a nuclear power plant.

2. Description of the Prior Art

Hydrostatic, radially tapered "film-riding" seals are known in the prior art. In the coolant pumps utilized in the primary heating systems of nuclear power plants, such seals allow the pump shafts to transmit torque through the pressurized interior of the pump housing with a minimal amount of friction and water "leak-off". In the past, such seals have utilized a sealing ring and a runner formed from alumina which include sealing surfaces tapered at specific angles in order to form a hydrostatic film between the sealing surface of the ring and sealing surface of the runner. This hydrostatic film allows the ring and the runner to operate in a non-rubbing mode. Unfortunately, such prior art shaft seals are not without shortcomings. However, in order to fully appreciate these shortcomings, at least a general understanding of the structure and operation of the cooling pumps which form the environment of such seals is necessary.

Nuclear power plants which incorporate the general design pioneered by Westinghouse Electric Corporation have separate primary and secondary hydraulic systems. Generally speaking, the primary system includes a coolant pump for circulating water from the hot, radioactive reactor core through the interiors of a plurality of U-shaped tubes mounted in the tubesheet of a nuclear steam generator. Water from the secondary system flows over the outside surfaces of these U-shaped tubes and absorbs the heat radiated and conducted through the walls of the heat exchange tubes. This water from the secondary system ultimately forms steam which is used to drive the turbines of the nuclear power plant, and generate electricity. Because the water in the primary system is hydraulically insulated from the water in the secondary system by the heat exchange tubes, the Westinghouse system allows non-radioactive water to be used to generate the steam which ultimately spins the turbines of the electric generators.

In order to generate an optimum amount of electric power from the hot, radioactive reactor cores, it is necessary to use a coolant pump to rapidly circulate water within the primary system from the reactor core to the interiors of the U-shaped tubes in the nuclear steam generator, and back again. Consequently, the water within the housing of the coolant pump is typically about 550° F., and pressurized to a level of approximately 2,250 psi. Because the pump shaft of the coolant pump is rotatably mounted across the pressure boundary between the interior of the pump housing and the outside atmosphere, the pressure differential tends to bias the pump shaft out of the pump housing in much the same way a hot gas pushes a piston out of a cylinder. Prior art shaft seals were developed in order to allow the pump shaft to transmit torque through the pressurized pump casing with a minimum of friction, and a minimum of water leakage through the casing. Such shaft seals generally comprised a sealing ring mounted onto the pump casing, and a runner mounted on top of a flange of the pump shaft. The pressure within the pump housing placed a compressive load between the sealing ring and the runner; however, this compressive load was counteracted by a flowing film of water between the sealing surfaces of the ring and the runner. Such a film was generated by providing a radial taper on the sealing surface of the sealing ring, so that it was very shallow frustro-conical, rather than flatly horizontal. Pressurized water surrounding the annular space between the two sealing surfaces would create a film of flowing water approximately one-half of one mil thick, which would allow the sealing ring and the runner to "ride" upon one another without a frictional or rubbing contact.

One of the potential problems associated with the seals used in such coolant pumps is erosion. The water in the primary system contains abrasive particles (as a result of the corrosion which takes place within the system) which can scratch the sealing surfaces if these particles are allowed to flow between these surfaces. In order to prevent abrasive, particulate matter in the primary system from flowing through the narrow space between the sealing surfaces of the ring and the runner, injection pumps have been provided on such coolant pumps which pump cooler, filtered water into the region around the seal at a slightly higher pressure than the primary water present within the balance of the pump housing. The provision of such injection pumps also allows the resulting "leak-off" which occurs as a result of the creation of the fluid film to be non-radioactive, which in turn minimizes potential radiation contamination within the plant.

While the aforementioned prior art shaft seals operate satisfactorily under normal conditions, severe damage can result to the seals under a variety of emergency conditions. If, for example, the pressure within the pump housing should fall below about 2,000 psi, the seal may cease to operate in a film-riding mode and start to operate in a frictional or "rubbing" mode. In alumina seals, if this should occur for more than 30 seconds, the seal will be irreparably damaged. Additionally, the flow speed of the film of water between the sealing surfaces varies substantially with fluctuations in the pressure of the water within the pump housing. Thus, in an overpressure condition, the film speed can become high enough to generate a turbulent flow between the sealing surfaces. Since a turbulent flow generates a film which is far less stiff than a laminar fluid flow, the sealing surfaces may start to operate in the previously mentioned rubbing mode, which in turn will destroy the seal. Even if the seal is not destroyed, such a high film speed may cause the amount of water "leak-off" to become unacceptably high. On the other hand, should the pressure drop below a certain point, the seal will self-destruct as a result of the loss of a film of sufficient "stiffness" to separate the sealing surfaces. A further shortcoming of seals having sealing rings and runners formed from alumina is their tendency to erode in the event the injection pumps fail. Under such circumstances, abrasive, particulate matter from the primary water system passes through the narrowly adjacent sealing surfaces and scratches them. If the operation of the injection pumps is not quickly restored, the sealing surfaces can become irreparably damaged. In all cases, if the seal is destroyed, an expensive shut-down of the plant is necessary before the seal can be replaced.

Clearly, there is a need for an improved shaft seal which is capable of operating in a rubbing mode should the pressure in the coolant pumps fail. Ideally, such a shaft seal should have a fairly constant film flow rate, and low "leak-off" despite wide variations in the pressure of the water within the pump housing. Finally, such a seal should have good anti-erosive characteristics should the failure of the injection pumps allow abrasive, particulate matter from the primary system to flow between the sealing surfaces of the ring and runner.

SUMMARY OF THE INVENTION

In its broadest sense, the invention is an improved sealing assembly for transmitting mechanical energy across a pressure boundary while substantially maintaining the integrity of the pressure boundary which comprises at least one sealing surface formed from silicon nitride. The invention finds particular application as a shaft seal in the coolant pumps utilized in nuclear steam generators.

The invention generally comprises a sealing ring and a runner, each of which includes a substantially flat face for forming a sealing surface, and each of which is formed from silicon nitride. The sealing surfaces of the ring and the runner are relatively movable with respect to one another, and biased toward one another. Additionally, the two sealing surfaces are slightly radially tapered with respect to one another in order to convert some of the ambient pressurized fluid into a flowing fluid film upon which the relatively movable sealing surfaces may "ride" without coming into direct frictional engagement with one another.

Both the ring and the runner are preferably formed from hot-pressed silicon nitride which is at least 98% pure. Additionally, the angle of radial taper between the two sealing surfaces is preferably selected so that the resulting speed of the flowing film of fluid is large enough to prevent the sealing surfaces from coming into contact, but small enough to prevent a turbulent flow from occurring within the fluid film. When the invention is used as a shaft seal within a water pump wherein the water is pressurized to between 200 and 2,500 psi, the outer peripheries of the ring and the runner are tapered relative to one another at an angle of between about 590 and 690 microradians, while the inner peripheries of these components are tapered at an angle of between about 170 and 270 microradians. In the preferred embodiment, the outer peripheries of the ring and runner are relatively tapered at an angle of approximately 640 microradians, while the inner peripheries are tapered at an angle of approximately 220 microradians. Additionally, all of the tapering is preferably located on the sealing surface of the sealing ring, while the sealing surface of the runner is flat.

The invention provides a shaft seal capable of operating in a film-riding mode despite broad variations in the pressure and temperature of ambient pressurized fluid forming the film. Additionally, the hardness and smooth surface texture of the hot-pressed silicon nitride forming the sealing surfaces provide a shaft seal which is erosion-resistant and capable of operating a non-film-riding mode for substantial periods of time without significant damage in the event that the film-forming source of pressurized fluid should cease to operate (as might be the case, for example, with a pump malfunction).

BRIEF DESCRIPTION OF THE SEVERAL FIGURES

FIG. 2 is a plan view of the sealing ring of the primary sealing assembly, and the clamping ring which mounts it within the pump housing;

FIG. 3 is a partial, cross-sectional view taken along the line 3—3 of FIG. 2, and FIG. 4 is an enlarged, cross-sectional view of the sealing ring of the sealing assembly of the invention.

DETAILED DESCRIPTION OF THE PREFERRED EMBODIMENT

Figure 1:
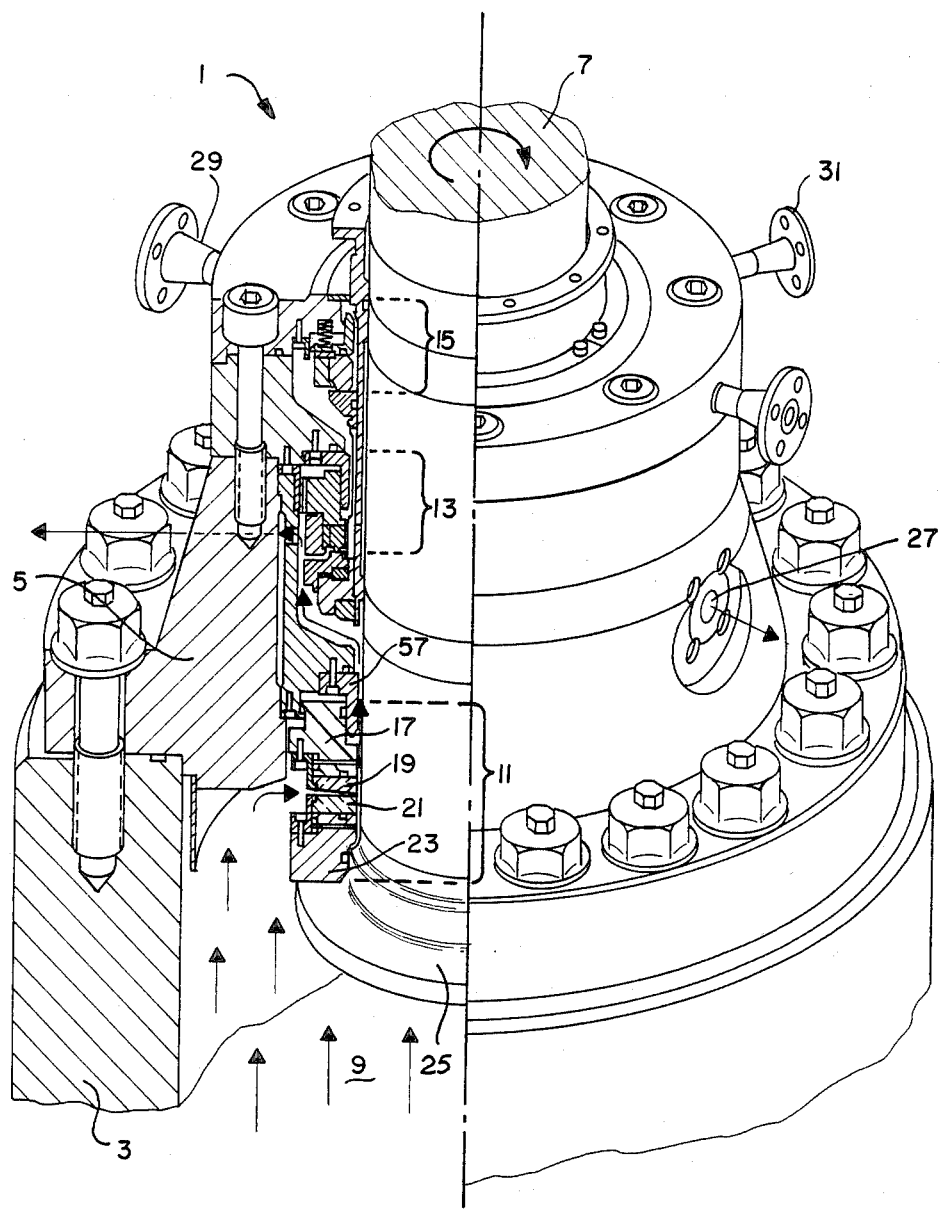
FIG. 1 is a cutaway perspective view of the housing of a coolant pump, illustrating the primary, secondary and tertiary sealing assemblies which surround the pump shaft in this region of the housing.

General Overview of the Structure and Function of the Invention

With reference now to FIG. 1, wherein like components are assigned like numerals throughout all of the several Figures, the invention finds particular utility within the centrifugal coolant pumps 1 used to circulate water through the radioactive core of a nuclear power station. Such coolant pumps 1 generally include a pump housing 3 which terminates at one end in a bearing assembly 5. A pump shaft 7 is sealingly and rotatably mounted within the bearing assembly 5. Although not specifically shown in FIG. 1, the bottom portion of the pump shaft 7 is connected to an impeller, while the top portion is connected to a high-horsepower, induction-type electrical motor. When the motor rotates the shaft 7, the impeller within the housing 9 pressurizes the water flowing through the pump housing from ambient pressure to approximately 2,250 psi. This pressurized water applies an upwardly directed, hydrostatic load upon the shaft 7 since the upper portion of the bearing assembly 5 is surrounded by the ambient atmosphere.

In order that the pump shaft 7 might rotate freely within the bearing assembly 5 while maintaining the 2,250 psi pressure boundary between the housing interior 9 and the outside of the bearing assembly 5, the primary, secondary and tertiary sealing assemblies 11, 13 and 15, respectively, are provided in the positions illustrated. Most of the necessary pressure sealing is performed by the primary sealing assembly 11, which embodies the invention.

The primary sealing assembly 11 generally includes a sealing ring 17 which is stationarily mounted within the bearing assembly 5 by a clamping ring 19, and a runner 21 which is mounted onto a flange 25 of shaft 7 by means of another clamping ring 23. The bottom surface of the sealing ring 17 and the top surface of the runner ring 21 form sealing surfaces 18 and 22, which are biased toward one another as a result of the fluid pressure load on the pump shaft 7. However, the sealing surfaces 18 and 22 normally do not frictionally engage on another, since the sealing surface 18 of the sealing ring 17 is tapered at a shallow angle with respect to the substantially flat and horizontal sealing surface 22 of the runner 21. Such tapering provides a flowing film of water between the sealing surfaces 18 and 22 of the sealing ring and the runner 21, which in turn allows the sealing ring 17 and runner 21 to rotate relative to one another in a "film-riding" mode. Additionally, both the sealing ring 17 and the runner 21 are formed from 98% pure, hot-pressed silicon nitride in order that the primary seaing assembly 11 may operate in a non-film-riding mode should the coolant pump 1 fail to provide water pressurized enough to create the aforementioned film of flowing water between the sealing surfaces 18 and 22. The use of hot-pressed silicon nitride, in combination with the specific taper angles described hereinafer, provide a shaft seal which is not only capable of operating in a non-film-riding mode (in the event of a malfunction or other emergency within the coolant pump 1), but also provides a shaft seal which is extremely durable and resistant to a variety of deleterious mechanical effects (e.g., as a result of "thermal shock").

Because the primary sealing assembly 11 normally operates in a film-riding mode, some provision must be made for handling the water which "leaks off" in the annular space between the shaft 7, or within the bearing assembly 5 which rotatably mounts the shaft 7. Accordingly, bearing assembly 5 includes a primary leak-off port 27. Leak-off ports 29 and 31 accommodate water leakage from secondary and tertiary sealing assemblies 13 and 15, respectively. However, as the leak-off ports do not comprise the invention claimed herein, no further description will be given of them.

Specific Description of the Structure and Operation of the Invention

With specific reference now to FIGS. 2 and 3, the clamping ring 19 which mounts the sealing ring 17 within the bearing assembly 5 of the coolant pump 1 generally comprises a base member 35 and a retaining ring 37. Base member 35 has flat upper and lower surface 36a and 36b as shown. In the preferred embodiment, both the base member 35 and retaining ring 37 are formed from a corrosion-resistant material such as #410 stainless steel. The retaining ring 37 mounts the flat bottom surface 66 of the sealing ring 17 against its flat upper surface 36a by means of an annular shoulder 39 which is receivable within an annular recess 41 extending around the periphery of the sealing ring 17 as shown. Retaining ring 37 is secured onto the base member 35 by means of four stainless steel bolts 43a–43d which are preferably equidistantly spaced in order to equilibrate the compressive load which the retaining ring 37 applies around the periphery of the sealing ring 17. To prevent the flat bottom surface 66 of the sealing ring 17 from sliding around the flat top surface 36a of the base member 35, a plurality of equidistantly spaced pins 45 are provided which extend a short distance above the upper surface 36a of the base member 35. The upper portions of these pins 45 are registrable with, and receivable within, a plurality of shallow cylindrical bores 47 present on the lower face 66 of the sealing ring 17. The provision of such pins 45 and bores 47 is important, since considerable shear forces may be applied between the bottom surface 66 of the sealing ring 17 and the top surface 35a of the base member 35, should the sealing assembly 11 ever have to operate in a "rubbing" mode.

In order to prevent the injection water surrounding the sealing assembly 11 from flowing between the upper surface 36a of the base member 35 and the bottom surface 66 of the sealing ring 17, an O-ring 48 is provided around the upper surface 36a of the base member 35. This O-ring 48 is seated within an annular groove 50 which circumscribes the upper surface 36a of the base member 35 as indicated. To insure that injection water does not flow between the inner diameter of the retaining ring 37 and the outer diameter of the base member 35, two O-rings 49a and 49b are further provided, each of which is seated within a circumferential groove 51a and 51b as indicated. Finally, an O-ring 53 is seated within an annular groove 55 which circumscribes the inner diameter of the base member 35. O-ring 53 allows the inner diameter of the base member 35 to vertically ride on the previously mentioned cylindrical sleeve 57 (see FIG. 1) which forms part of the bearing assembly 5 of the coolant pump 1.

With reference now to FIG. 4, the cross-sectional shape of the sealing ring 17 is generally rectangular, with the exception of the frustro-conical shape of the upper surface 18 (which will be described in detail presently), and the annular recess 41 which receives the previously described annular shoulder 39 of the retaining ring 37. As mentioned above, both the sealing ring 17 and the runner 21 are formed from 98% pure, hot-pressed silicon nitride, which is available from the Norton Company of Worcester, Mass.

The upper surface 18 of the sealing ring 17 includes an outer periphery 62 and an inner periphery 64. The outer periphery 62 is radially tapered at an angle $\theta$ from the horizontal which, in the preferred embodiment, is 640 microradians (referenced from the dotted line extending through the origin "O" as shown in FIG. 4). While the inner periphery 64 is likewise radially tapered with respect to the horizontal by an angle $\alpha$, this angle is preferably shallower than the angle $\theta$. In the preferred embodiment, $\alpha$ is equal to 220 microradians (as referenced from the dotted line extending through the origin "O" as shown in FIG. 4). While the seal assembly 11 of the invention would be operable if $\theta$ and $\alpha$ were selected to be anywhere within 100 microradians of 640 microradians and 220 microradians, respectively, the aforementioned preferred values provide a shaft seal which will successfully operate in a film-riding mode with a relatively constant and small amount of "leak-off" despite substantial variations in the type and pressure of the injection water which flows through the tapered space between the sealing surfaces 18 and 22 of the sealing ring 17 and runner 21, respectively.

The structure of the runner 21 is exactly the same as the sealing ring 17, the only exception being that the top sealing surface 22 of the runner 21 is perfectly flat, rather than tapered. Additionally, the structure of the clamping ring 23 of the runner 21 is substantially the same as the previously described clamping ring 19 of the sealing ring 17, the only significant exception being that the bottom surface of the base member of the clamping ring 23 includes a plurality of bores for receiving pins which are mounted on the upper surface of the shaft flange 25 of the pump shaft 7 (see FIG. 1). The provision of these bores in the bottom surface of the clamping ring 23 and the pins in the top surface of the shaft flange 25 insures that the clamping ring 23 will not rotatably slide against the shaft flange 25 due to shear forces, should the sealing assembly 11 ever operate in a "rubbing" mode.

The use of hot-pressed silicon nitride which is 98% pure in both the sealing ring 17 and the runner 21, in combination with the aforementioned taper angles $\theta$ and $\alpha$ of 640 microradians and 220 microradians, respectively, provides a shaft seal 11 which is superior in a number of respects to prior art shaft seals having alumina sealing rings and runners.

First, as previously indicated, both the fluid speed of the film and the amount of "leak-off" of the injection water remain at a very constant rate despite any large fluctuations which might occur in the pressure of the water within the pump housing interior 9 (i.e., 70–90 feet per second, and 3 gallons per minute, respectively). This is in turn results in a hydrostatic film having the proper "stiffness" despite substantially variations in the pressure of the water within the pump housing interior 9.

Secondly, the sealing surfaces 18 and 22 of the sealing ring 17 and the runner 21 have extremely good rubbing resistances which allow them to operate in a non-film-riding or rubbing mode for relatively long periods of time without damage. Specifically, seals manufactured in conformance with the invention can operate in a rubbing mode for as long as 90 minutes without significant damage; by contrast, a sealing assembly formed from alumina will become irreparably damaged if it operates for more than 30 seconds in such a "rubbing" mode.

Third, a sealing assembly utilizing hot-pressed silicon nitride has much better erosion resistance than a comparable sealing assembly formed from alumina. This is important, since in the event of a malfunction of the injection pumps in the coolant pump 1, water from the primary system might enter into the tapered space between the sealing ring 17 and the runner 21, which in turn would expose the sealing surfaces 18 and 22 of these components to abrasive particles of foreign matter (such as iron oxide). Should this malfunction occur, the silicon nitride sealing ring 17 and runner 21 would suffer far less damage than similar rings from alumina.

Fourth, a sealing assembly made in conformance with the invention would have a far superior fracture toughness (i.e., compressibility) than a sealing assembly which utilized sealing rings and runners formed from alumina. This is additionally important, since these rings and runners can be subjected to compressive loads of up to 90,000 pounds.

Finally, the sealing assembly of the invention has substantially superior thermal shock properties over a similar sealing assembly formed from alumina. In the event the injection pumps should fail, and the substantially hotter water from the primary system enter the tapered space between the sealing ring 17 and the runner 21, rings and runners formed in accordance with the present invention will be able to operate without fracturing, or the loss of film of sufficient "stiffness", which could occur in rings and runners formed from other materials.

I claim as my invention:

1. A sealing assembly for maintaining a pressure boundary in a heated and pressurized fluid that contains abrasive particles while transmitting mechanical energy across said pressure boundary, comprising a sealing ring and a seal runner, each of which includes a substantially flat face for forming a sealing surface, and each of which is substantially formed from silicon nitride, wherein said sealing surfaces are relatively movable with respect to one another, are biased toward one another by a compressive force of up to 90,000 pounds and radially tapered with respect to one another in order to direct said fluid at said pressure boundary into a film of flowing fluid between said surfaces upon which said relatively movable sealing surfaces ride, and wherein said silicon nitride that forms said sealing ring and ring runner is hot pressed and at least 98% pure in order to render said ring and runner resistant to both abrasion from said particles and to thermal shock, and further to render said sealing ring and runner operative in a non-film riding mode for at least 30 minutes without significant wear.

2. The sealing assembly of claim 1, wherein the angle of radial taper between said sealing surfaces is selected so that the resulting speed of the flowing film of fluid is large enough to prevent the sealing surfaces from coming into contact, but small enough to prevent a turbulent flow from occurring in the fluid film.

3. The sealing assembly of claim 1, wherein said compressive force is sufficient to elastically deform said seal ring and said seal runner, and said angle of radial taper between said sealing surfaces is selected so that the resulting angle after deformation allows a film of fluid to flow between the sealing surfaces with a fluid speed large enough to prevent the sealing surfaces from coming into contact, but small enough to prevent a turbulent flow from occurring in the fluid film.

4. The sealing assembly of claim 1, wherein the outer and inner peripheries of the ring and runner are tapered at substantially different angles with respect to one another.

5. The sealing assembly of claim 4, wherein the outer peripheries of the ring and runner are tapered along a first straight line at an angle of between about 590 and 690 microradians, and the inner peripheries of the ring and runner are tapered along a second straight line that intersects with the first at an angle of between about 170 and 270 microradians.

6. The sealing assembly of claim 5, wherein said fluid is water, under a pressure of between about 200 and 2,500 psi.

7. The sealing assembly of claim 1, wherein said fluid is water, and wherein said angle of radial taper between said sealing surfaces is selected so that the speed of said flowing film of water is between about 50 and 140 feet per second.

8. A film-riding shaft seal for sealingly and rotatably mounting a torque-transmitting shaft within a housing containing pressurized water, comprising:
   (a) a seal ring circumscribing said shaft and sealingly mounted within the housing which is substantially formed from silicon nitride and which includes a frusto-conical face for forming a sealing surface radially tapered between about 620 and 660 microradians around its outer periphery, and between about 200 and 240 microradians around its inner periphery, and
   (b) a runner circumscribing said shaft and sealingly mounted around said shaft which includes a flat face biased toward the frustro-conical face of the sealing surface of the seal ring,
   wherein the pressurized water within the housing creates a flowing film of water between the sealing surfaces which prevents the sealing surfaces from coming into contact with one another.

9. The film-riding shaft seal of claim 8, wherein the outer periphery of the sealing surface of the seal ring is radially tapered between about 635 and 645 microradians, and wherein the inner periphery of this surface is radially tapered between about 210 and 230 microradians.

10. The film-riding shaft seal of claim 8, wherein the water within the housing is pressurized between about 2,000 and 2,500 psi.

11. The film-riding shaft seal of claim 8, wherein both the ring and the runner are formed from hot-pressed silicon nitride which is at least 98% pure.

12. A film-riding shaft seal for sealingly and rotatably mounting a torque-transmitting shaft within a housing containing water pressurized to between about 200 and 2,500 psi, comprising:
   (a) a sealing ring circumscribing said shaft and sealingly mounted within the housing which is formed from hot-pressed silicon nitride of at least 98% purity, and which is radially tapered between about 635 and 645 microradians around its outer periphery and between about 210 and 230 microradians around its inner periphery, and
   (b) a runner circumscribing said shaft and sealingly mounted around said shaft which includes a flat face biased toward the frustroconical face of the sealing surface of the sealing ring, as a result of the force applied to the shaft from pressurized water contained within the housing,
   wherein the pressurized water enters the annular space between the two sealing surfaces and creates a flowing film of water whose flow rate remains substantially constant despite substantial variations in the pressure of the water in the housing.

13. A film-riding shaft seal for sealingly and rotatably mounting a torque-transmitting shaft within a housing containing heated water that is pressurized to between about 200 and 2,500 psi and which contains abrasive particles substantially formed from iron oxide, comprising:
   (a) a sealing ring circumscribing said shaft and sealingly mounted within the housing which is formed from hot-pressed silicon nitride of at least 98% purity, and which is radially tapered along its outer periphery along a first straight line at an angle of between about 635 and 645 microradians with respect to the horizontal, and which is radially tapered along its inner periphery along a second straight line which intersects with the first at an angle of between about 210 and 230 microradians with respect to the horizontal, and
   (b) a runner circumscribing said shaft and sealingly mounted around said shaft which includes a flat face biased toward the frustroconical face of the sealing surface of the sealing ring as a result of the force applied to the shaft from pressurized water contained within the housing,
   wherein the pressurized water enters the annular space between the two sealing surfaces and creates a flowing film of water whose flow rate remains substantially constant despite substantial variations in the pressure of the water in the housing, and wherein said hot-pressed, 98% pure silicon nitride renders said ring and runner resistant to abrasion from said iron oxide particles, thermal shock from said heater water, and fractures from said compressive force, and further renders said sealing ring and runner operative in a non-film riding mode for at least 60 minutes without significant wear.

* * * * *